United States Patent Office 2,807,625
Patented Sept. 24, 1957

2,807,625
TREATMENT OF GLUTAMIC ACID

William E. Jones, Winona, Minn., assignor to International Minerals & Chemical Corporation, a corporation of New York No Drawing. Application October 10, 1955,
Serial No. 539,684

15 Claims. (Cl. 260—326.3)

The present invention relates to a process for the conversion of glutamic acid to pyrrolidonecarboxylic acid. More particularly, the present invention relates to a process for the conversion of glutamic acid to pyrrolidonecarboxylic acid in the presence of a catalyst.

Glutamic acid is a constituent of hydrolyzates of vegetable and animal proteins and of mixtures resulting from the desugarization of sugar beet solutions by the Steffen's process. These mixtures containing glutamic acid are complex in nature and contain compounds such as organic acids, amino acids and inorganic salts. Because of its physical and chemical properties it is easier to separate pyrrolidonecarboxylic acid (the lactam of glutamic acid) from the other amino acids and the impurities inherently present in protein hydrolyzates and in Steffen's filtrate than it is to separate glutamic acid itself therefrom.

Up to the present time, a commercially feasible method for the substantially complete conversion of glutamic acid to the lactam has not been available. When an aqueous solution containing glutamic acid is heated, an equilibrium concentration ratio of glutamic acid to pyrrolidonecarboxylic acid is approached which is dependent upon the pH of the solution or mixture. At a pH of about 7, the equilibrium concentration ratio of pyrrolidonecarboxylic acid to glutamic acid is about 98:2; that is, only about 2% of the total glutamic acid material originally present is in the form of glutamic acid. However, at a pH of about 7, the rate of conversion of glutamic acid to pyrrolidonecarboxylic acid is extremely slow, and equilibrium is reached only after prolonged heating periods. For this reason, lower pH's, such as about 3.2 at which pH the rate of conversion is much more rapid than at a pH of 7, have been employed for converting glutamic acid to its lactam. Although the reaction proceeds at a higher rate, the equilibrium concentration ratio of pyrrolidonecarboxylic acid to glutamic acid is lower at the lower pH's. For example, at a pH of 3.2, only about 92.5% of the total glutamic acid material exists in the form of pyrrolidonecarboxylic acid when equilibrium is attained.

U. S. Patent No. 2,434,715 describes the conversion of glutamic acid present in an acidic protein hydrolyzate to pyrrolidonecarboxylic acid by autoclaving the hydrolyzate, having a pH of about 3, for about four hours at a temperature of about 125° C. Following the autoclaving, the reaction product mixture is filtered to remove any solid material and then extracted with ethyl acetate over a period of 48 hours to remove the pyrrolidonecarboxylic acid therefrom. Because conversion of glutamic acid values to pyrrolidonecarboxylic acid is incomplete under these conditions of autoclaving, the step of autoclaving and extracting must be repeated several times to afford an economically acceptable recovery. According to the patent, the pyrrolidonecarboxylic acid-containing solution must be autoclaved and extracted four or five times, thereby necessitating between about 200 and about 250 hours to obtain a good yield of pyrrolidonecarboxylic acid.

An additional disadvantage of the process is the requirement that the pyrrolidonecarboxylic acid-containing solution be heated at superatmospheric pressures in autoclaves and at a pH of about 3.0. Under these acidic conditions, corrosion of equipment is excessive and the process is economically prohibitive.

It would be desirable if a process were available for the conversion of glutamic acid to pyrrolidonecarboxylic acid which would be carried out at a sufficiently rapid rate under neutral conditions at atmospheric pressure to be commercially feasible.

It is an object of the instant invention to provide a process for the conversion of glutamic acid to pyrrolidonecarboxylic acid which overcomes certain limitations and disadvantages of the processes heretofore known.

It is a further object of the instant invention to provide a process for the substantially complete conversion of glutamic acid in a neutral aqueous mixture to pyrrolidonecarboxylic acid.

It is a further object of the instant invention to provide a one-step process for the substantially complete conversion of glutamic acid in a neutralized protein hydrolyzate to pyrrolidonecarboxylic acid at atmospheric pressure and reflux temperatures.

These and other objects of the instant invention will become more apparent upon a fuller understanding of the process as herein described.

It has been found that in the presence of an inorganic catalyst comprising heavy metal catalysts, aluminum, magnesium, and oxides, halides and sulfates of these metals, the rate of conversion of glutamic acid present in a neutralized mixture to the lactam, pyrrolidonecarboxylic acid, is accelerated.

Generally speaking, the instant novel process comprises adding a catalyst selected from the group consisting of heavy metal catalysts, aluminum or magnesium or an oxide, halide or sulfate of one of these metals, or any combination of these, to a substantially neutralized aqueous solution of glutamic acid and heating the resulting mixture to an elevated temperature, desirably a temperature between about 100° C. and about 150° C., and preferably the reflux temperature of the mixture, until conversion of glutamic acid to pyrrolidonecarboxylic acid is substantially complete.

The catalyst, which is preferably in finely divided form such as, for example, zinc dust or iron powder, to facilitate better contact with glutamic acid may be utilized in widely varying quantities depending upon a number of factors such as the temperature to be employed, the equipment at hand, and the reaction time desired for completion of the reaction. As little as 0.5% catalyst based on the weight of raw material treated may be utilized under certain conditions to obtain substantially complete conversion of glutamic acid to pyrrolidonecarboxylic acid, and as much as 40% catalyst may be utilized if the shortest reaction periods are desired or if it is desired to operate at fairly low temperatures without extending reaction times. There appears to be no advantage in using more than 40% catalyst in this process, the expense of the catalyst more than offsetting any increased yields of pyrrolidonecarboxylic acid which might be obtained or savings in reaction time.

Although all of the catalysts of this invention may be utilized in amounts of between about 0.5% and about 40% based on the raw material utilized, gluten or concentrated Steffen's filtrate, etc., as the case may be, the activities of the catalysts are not identical and for optimum results the quantity of catalyst used varies from one catalyst to another.

Maximum conversions of glutamic acid to pyrrolidonecarboxylic acid are obtained using between about 10% and about 20% zinc dust based on the weight of glutamic acid raw material, or between about 5% and about 10% reduced iron or about 40% granulated iron on the same basis. Under these conditions, conversions of glutamic acid to pyrrolidonecarboxylic acid are between about 96% and about 100% complete. For the most economical conversions, however, about 1% zinc dust or about 3.5% reduced iron may be utilized, these quantities producing overall conversions of 95% and 97.4% after 48 hours of reaction time.

Zinc dust, in addition to catalyzing the conversion of glutamic acid to pyrrolidonecarboxylic acid, is particularly useful in that upon addition to a neutralized solution of glutamic acid an immediate reduction in color intensity takes place. For example, a corn gluten hydrolyzate having a brown color is immediately reduced to a pale yellow buff hue. This clarification is complete within five minutes following the addition of less than about 0.5% zinc dust.

In preferred embodiment of the instant invention, between about 0.5 gram and about 10 grams of zinc dust per 100 grams of raw material is added to a neutralized hydrolyzate of corn gluten, and the resulting mixture is heated at about reflux temperature for between about 4 hours and about 120 hours, preferably between about 24 hours and about 72 hours, depending upon the amount of catalyst added. When smaller amounts than the preferred amount of catalyst is employed, the mixture must be heated for longer periods of time and at slightly higher temperatures, in order to effect a comparable conversion of glutamic acid to pyrrolidonecarboxylic acid. Although zinc and iron and their oxides, sulfates or halides are particularly preferred catalysts, other metals such as copper, aluminum and magnesium, although of lesser value in this invention, are preferred over other heavy metals.

Metal compounds which may be particularly mentioned as useful in practicing the instant invention include aluminum sulfate, chromium chloride, chromium ammonium sulfate, cobalt sulfate, copper sulfate, ferric chloride, ferric sulfate, ferric ammonium sulfate, ferrous sulfate, mercuric sulfate, molybdenum oxide, zinc sulfate, zinc oxide, iron oxides, aluminum oxide, copper oxide, magnesium oxide, zinc halides, iron halides, aluminum halides, copper halides and magnesium halides, such as zinc chloride, iron chloride, aluminum chloride, copper chloride and magnesium chloride. Mixtures of any two or more of these compounds may also be used.

When a mixture containing glutamic acid is neutralized to a pH of about 7 and is refluxed in the presence of metallic iron for about six hours, the conversion of glutamic acid to pyrrolidonecarboxylic acid is approximately 40%. Under comparable conditions but in the absence of any catalyst, the conversion of pyrrolidonecarboxylic acid is only about 3% complete. In order for the conversion of the glutamic acid to pyrrolidonecarboxylic acid to proceed to substantial completion, the solution is heated for about 16 hours or longer at reflux temperature.

Preferably the reaction of this invention is conducted at atmospheric pressure and at reflux temperature, but higher pressures and temperatures may be employed if desired. Temperatures below reflux are avoided due to lower reaction rates. The reaction must be carried out below the decomposition temperature of both glutamic acid and pyrrolidonecarboxylic acid and temperatures above reflux temperature are disadvantageous in that pressure equipment must be used.

In one embodiment of the instant invention, the process comprises neutralizing a corn gluten hydrolyzate to a pH of about 7, separating humin resulting from the hydrolysis, for example, by filtration, and adding iron powder to the resulting solution to the extent of between about 3.5% and about 40% by weight of the gluten raw material. The resulting mixture is heated for between about 4 hours and about 120 hours at reflux temperature and atmospheric pressure.

As the amount of the catalyst is increased, lower temperatures and shorter periods of time of heating may be employed to effect the substantially complete conversion of glutamic acid to pyrrolidonecarboxylic acid. If desired, the resulting pyrrolidonecarboxylic acid-containing mixture can be treated by any of the known methods to separate the pyrrolidonecarboxylic acid from the other constituents of the original hydrolyzate; for example, methods as described in copending application, Serial No. 258,085, filed November 24, 1951, now Patent No. 2,738,353. Upon rehydrolysis of the resulting pyrrolidonecarboxylic acid in the mixture, restoration to L-glutamic acid is about 97.2% complete.

In another embodiment of the instant invention, zinc dust is added to a corn gluten hydrolyzate which has been neutralized with hydrochloric acid to a pH of about 7, and filtered to remove humin therefrom. Zinc is added to the resulting solution to the extent of between about 0.5% and about 40% by weight of the gluten raw material, and the resulting mixture is heated for between about 4 hours and about 120 hours at reflux temperature and atmospheric pressure. The reaction time depends upon the quantity and degree of fineness of the catalyst. About 98% of the glutamic acid present in the hydrolyzate is converted to pyrrolidonecarboxylic acid when the reaction is allowed to proceed to substantial completion.

The degree of fineness of the catalyst is an important factor contributing to the efficiency of the reaction. The more finely divided the catalyst, the more efficient the conversion. As the surface area of catalyst is increased, the smaller the amounts of catalyst required in order to convert efficiently the glutamic acid to pyrrolidonecarboxylic acid. The degree of effectiveness of the metallic catalyst depends upon the quantity of the catalyst employed, the fineness of the particles of the catalyst, and the degree of solubility of the catalyst in the reaction medium, the more soluble catalysts permitting better contact with the glutamic acid.

The instant novel process may be carried out on any mixture containing glutamic acid or monosodium glutamate, such as animal or vegetable protein hydrolyzates, on Steffen's filtrates or their hydrolyzates, and on similar mixtures containing glutamic acid or monosodium glutamate; for example, eluates from anion exchange resin columns in beet sugar factories, vinasse, etc.

By this method the glutamic acid present in neutral mixtures prepared from raw materials containing glutamic acid or glutamic acid precursor compounds is converted to pyrrolidonecarboxylic acid.

The following examples illustrate specific embodiments of the instant invention. All parts and percentages are by weight unless otherwise indicated.

EXAMPLE I

A corn gluten hydrolyzate was prepared by refluxing Maco corn gluten in the presence of about 2 times its weight of 50% sulfuric acid for about 8 hours. The hydrolyzate was cooled, the pH of the hydrolyzate adjusted to about 7.0 with ammonium hydroxide, and the humin was separated by filtration. The resulting filtrate was refluxed for about 16 hours at atmospheric pressure in the presence of reduced iron powder in the amount of about 40% of the starting gluten. The iron was separated from the resulting mixture by filtration. The conversion of glutamic acid to pyrrolidonecarboxylic acid was about 98.2% complete. When a similarly treated hydrolyzate from which the humin has been removed was refluxed as above but in the absence of iron, the conversion was only about 7.7% complete.

EXAMPLE II

A neutralized sulfuric acid corn gluten hydrolyzate prepared as described in Example I and neutralized to pH 7 with aqueous ammonia was refluxed at atmospheric pressure for about 48 hours in the presence of zinc dust, in the amount of about 1% of the starting gluten. Zinc was separated from the resulting mixture by filtration. The conversion of glutamic acid to pyrrolidonecarboxylic acid was about 95.01% complete.

EXAMPLE III

A corn gluten hydrolyzate prepared as described in Example I was neutralized with aqueous ammonia to pH 7, humin was removed by filtration and washed with water, the washings being added to the filtrate. The combined humin filtrate and washings were permitted to stand 24 hours in an ice chest during which time tyrosine, leucine and some inorganic salts precipitated and were removed by filtration. The filtrate had a gluten equivalent of 0.22 grams per ml. Portions of the filtrate were refluxed for about 16 hours at atmospheric pressure in the presence of the indicated quantities of catalysts shown in Table 1 below. Except as otherwise indicated the quantity of catalyst was utilized in the amount of about 40% based on the weight of initial corn gluten. Following the refluxing, the catalyst was separated from the reaction product mixture by filtration, and the filtrate analyzed to determine the percent conversion of glutamic acid to pyrrolidonecarboxylic acid. A control portion of neutralized corn gluten hydrolyzate having a pH of 7 to which no catalyst was added was treated under the same conditions for the same length of time to determine what degree of conversion of glutamic acid to pyrrolidonecarboxylic acid was in each instance due to the presence of the catalyst. The results are shown in Table 1.

Table 1

| Catalyst | Percent catalyst | Degree of conversion to PC, percent |
|---|---|---|
| Control (no catalyst) | | 7.72 |
| Aluminum, powder | | 69.71 |
| Antimony, dust (−20 mesh) | | 46.51 |
| Brass, high zinc, turnings | | 51.49 |
| Lead, shavings | | 25.16 |
| Lead, antimonal, shavings | | 35.77 |
| Magnesium, powder | | 51.03 |
| Monel metal chips | | 20.12 |
| Stainless steel (316) chips | | 20.12 |
| Tin, granules | | 14.81 |
| Zinc, dust | | 94.63 |
| Zinc, dust, re-used | | 79.30 |
| Zinc, granules (20 mesh) | | 68.31 |
| Zinc, powder, purified | | 91.01 |
| Do | | 90.69 |
| 1:1 zinc dust + iron granules | | 79.50 |
| Iron, carbonyl (−325 mesh) | | 95.54 |
| Do | 20 | 88.62 |
| Iron, granules (100 mesh) | | 28.01 |
| Do | 20 | 76.58 |
| Do | 10 | 20.18 |
| Iron, galvanized, shavings | | 58.86 |
| Iron, reduced (U. S. P.) | | 98.32 |
| Do | 20 | 94.37 |
| Do | 10 | 98.19 |
| Do | 5 | 88.94 |
| Do | 1 | 75.94 |
| Iron, reduced (re-used) | | 51.1 |
| Aluminum sulfate | | 89.72 |
| Aluminum oxide | | 78.98 |
| Antimony oxide | | 30.72 |
| Chromium chloride | | 77.36 |
| Chromium ammonium sulfate | | 71.02 |
| Cobalt sulfate | | 52.85 |
| Copper sulfate | | 81.11 |
| Do | | 74.48 |
| Do | 20 | 81.82 |
| Do | 10 | 76.91 |
| Do | 5 | 88.16 |
| Do | 1 | 30.64 |
| Copper salt of pyrrolidonecarboxylic acid | | 57.50 |
| Ferric chloride | | 90.30 |
| Do | | 90.43 |
| Do | 20 | 87.77 |
| Ferric sulfate | | 86.93 |
| Do | | 83.70 |
| Do | 20 | 77.43 |
| Copper | 10 | 89.36 |
| Ferric sulfate | 10 | 70.89 |
| Do | 5 | 51.49 |
| Do | 1 | 25.03 |
| Ferric ammonium sulfate | | 83.18 |
| Ferrous sulfate | | 71.41 |
| Do | | 76.20 |
| Do | 20 | 64.88 |
| Do | | 63.58 |
| Ferrous ammonium sulfate | | 53.49 |
| Ferrous ammonium sulfate (re-used) | | 49.90 |
| Manganese sulfate | | 41.79 |
| Mercuric sulfate | | 82.02 |
| Molybdenum trioxide | | 77.36 |
| Molybdenum pentoxide | | 69.92 |
| Nickel sulfate | | 48.38 |
| Zinc sulfate | | 74.39 |
| Zinc oxide (24 hours) | | 93.01 |

This application is a continuation-in-part of application Serial No. 258,103, filed November 24, 1951, and entitled Treatment of Glutamic Acid, now abandoned.

Having thus fully described and illustrated the character of the instant invention, what is desired to be secured by Letters Patent is:

1. A process for the conversion of glutamic acid to pyrrolidonecarboxylic acid which comprises dispersing an inorganic catalyst selected from the group consisting of heavy metals, aluminum, magnesium and oxides, halides and sulfates of heavy metals, aluminum and magnesium, in a substantially neutral solution of glutamic acid, heating the resulting mixture for at least 4 hours, and separating solid material from the resulting pyrrolidonecarboxylic acid-containing mixture.

2. The process of claim 1 wherein the catalyst is zinc.

3. The process of claim 1 wherein the catalyst is iron.

4. A process for the conversion of glutamic acid to pyrrolidonecarboxylic acid which comprises adding an inorganic catalyst selected from the group consisting of heavy metals, aluminum, magnesium and oxides, halides and sulfates of heavy metals, aluminum and magnesium, said inorganic catalysts being in a finely divided state, to a substantially neutral solution of glutamic acid, heating the resulting mixture at reflux temperature and atmospheric pressure for at least 4 hours, and separating solid material from the resulting pyrrolidonecarboxylic acid-containing mixture.

5. The process of claim 4 in which the substantially neutral solution of glutamic acid is a protein hydrolyzate which has been neutralized.

6. The process of claim 5 wherein the catalyst is zinc.

7. The process of claim 5 wherein the catalyst is iron.

8. A process for the conversion of glutamic acid present in protein hydrolyzates to pyrrolidonecarboxylic acid which comprises adding zinc to a protein hydrolyzate which has been neutralized to a pH of about 7, heating the resulting mixture at a temperature between about 100° C. and about 150° C., and separating solid material from the resulting pyrrolidonecarboxylic acid-containing mixture.

9. A process for the conversion of glutamic acid to pyrrolidonecarboxylic acid which comprises adding between about 0.5 and about 40% by weight of the glutamic acid raw material of an inorganic catalyst selected from the group consisting of heavy metals, aluminum, magnesium and oxides, halides and sulfates of heavy metals, aluminum and magnesium, to a substantially neutral mixture containing glutamic acid, heating the resulting mixture for between about 4 and about 120 hours, and separating solid material from the resulting pyrrolidonecarboxylic acid-containing mixture.

10. A method for the conversion of glutamic acid to pyrrolidonecarboxylic acid which comprises adding between about 0.5 and about 40% by weight of the glutamic acid raw material of an inorganic catalyst selected from the group consisting of heavy metals, aluminum, magnesium and oxides, halides and sulfates of heavy metals, aluminum and magnesium, to a substantially neutral mixture containing glutamic acid, heating the resulting mixture at a temperature between about 100° C. and about 150° C. for between about 4 hours and about 120 hours, and separating solid material from the resulting pyrrolidonecarboxylic acid-containing mixture.

11. A method for the conversion of glutamic acid to pyrrolidonecarboxylic acid which comprises adding between about 0.5% and about 40% of zinc in a finely divided state to a substantially neutral mixture containing glutamic acid, heating the resulting mixture at a temperature between about 100° C. and about 150° C. for between about 4 hours and about 120 hours, and separating solid material from the resulting pyrrolidonecarboxylic acid-containing mixture.

12. A process for the conversion of the glutamic acid present in protein hydrolyzates to pyrrolidonecarboxylic acid which comprises adding between about 0.5% and about 40% by weight of zinc in a finely divided state to a protein hydrolyzate which has been neutralized to a pH of about 7, heating the resulting mixture at a temperature of between about 100° C. and about 150° C. for between about 4 hours and 120 hours, and separating solid material from the resulting pyrrolidonecarboxylic acid-containing mixture.

13. A process for the conversion of the glutamic acid present in protein hydrolyzates to pyrrolidonecarboxylic acid which comprises adding between about 0.5% and about 40% of iron in a finely divided state to protein hydrolyzate which has been neutralized to a pH of about 7, heating the resulting mixture at a temperature of between about 100° C. and about 150° C. for between about 4 hours and about 120 hours, and separating solid material from the resulting pyrrolidonecarboxylic acid-containing mixture.

14. A process for the conversion of glutamic acid present in concentrated Steffen's filtrate which comprises adding an inorganic catalyst selected from the group consisting of heavy metals, aluminum, magnesium and oxides, halides and sulfates of heavy metals, aluminum and magnesium, to the concentrated Steffen's filtrate, heating the resulting mixture at a temperature of between about 100° C. and about 150° C. for between about 4 hours and about 120 hours, and separating solid material from the resulting pyrrolidonecarboxylic acid-containing mixture.

15. A process for the conversion of glutamic acid present in concentrated Steffen's filtrate to pyrrolidonecarboxylic acid which comprises adding between about 0.5% and about 40% of zinc in a finely divided state to the concentrated Steffen's filtrate which has been neutralized to a pH of about 7, heating the resulting mixture at a temperature of between about 100° C. and about 150° C. for between about 4 hours and about 120 hours, and separating solid material from the resulting pyrrolidonecarboxylic acid-containing solution.

References Cited in the file of this patent

UNITED STATES PATENTS

| | | |
|---|---|---|
| 2,112,329 | Braun | Mar. 29, 1938 |
| 2,334,986 | Bersworth | Nov. 23, 1943 |
| 2,434,715 | Olcott et al. | Jan. 20, 1948 |